United States Statutory Invention Registration [19]

[11] Reg. Number: H55

Ramsey et al. [45] Published: May 6, 1986

[54] METHOD FOR IMPROVED MUD PULSE TELEMETRY

[76] Inventors: Mark S. Ramsey, 23439 Cranberry Trail, Spring, Tex. 77373; Larry A. Watkins, 2023 Wilcrest, Houston, Tex. 77042

[21] Appl. No.: 621,976

[22] Filed: Jun. 18, 1984

[51] Int. Cl.[4] ..... E21B 47/00
[52] U.S. Cl. ..... 73/155; 367/83
[58] Field of Search ..... 73/151, 155; 367/83, 367/84, 85

[56] References Cited

U.S. PATENT DOCUMENTS

| | | | |
|---|---|---|---|
| 2,352,833 | 7/1944 | Hassler | 367/84 X |
| 2,739,476 | 3/1956 | Atkins, Jr. | 73/861.14 X |
| 3,302,457 | 2/1967 | Mayes | 367/83 X |
| 3,555,504 | 1/1971 | Fields | 340/18 |
| 4,009,613 | 3/1977 | Jeter | 367/83 X |
| 4,224,687 | 9/1980 | Claycomb | 367/83 |
| 4,262,343 | 4/1981 | Claycomb | 367/83 |

FOREIGN PATENT DOCUMENTS

| | | |
|---|---|---|
| 78906 | 5/1983 | European Pat. Off. . |
| 78907 | 5/1983 | European Pat. Off. . |
| 2140599 | 11/1984 | United Kingdom . |

*Primary Examiner*—S. C. Buczinski
*Assistant Examiner*—Linda J. Wallace

[57] ABSTRACT

The present invention is a method for improved mud pulse telemetry. Mud pulse signals generated by a downhole mud pulser are detected at the surface by monitoring mud flow rate. Mud flow rate can be monitored by use of a flow meter placed downstream from the surge suppressor.

14 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR IMPROVED MUD PULSE TELEMETRY

FIELD OF THE INVENTION

The present invention relates to measurement while drilling operations. More particularly, the present invention relates to a method for improving the performance of measurement while drilling operations which utilize mud pulse telemetry.

BACKGROUND OF THE INVENTION

In petroleum and related wellbore drilling operations, there has long been a need for a measurement while drilling (MWD) method capable of transmitting real time data from inside a wellbore during drilling. Real time data concerning the drill bit and the formation being penetrated can be of great value to drilling personnel in making the best use of manpower and equipment.

There are at least four basic data telemetry methods which are currently being developed for MWD operations. These methods include the telemetry of data by electromagnetic radiation transmitted through the earth, by electric current transmitted through insulated conductor wires, by acoustical pulses transmitted through a drill string, and by pressure pulses transmitted through drilling mud. To date, only the last mentioned method, commonly known as mud pulse telemetry, has found commercial success.

In the drilling of oil and gas wells, drilling mud is typically circulated down the interior of a hollow drill string, through nozzles in a drill bit located at the bottom of the drill string, and back up to the surface through the annulus between the drill string and the wall of the wellbore. Large pumps, generally of the reciprocating variety, are used to circulate the drilling mud. A surge suppressor is typically located on the mud flow line between the mud pump and the drill string to smooth the flow coming from the pump. The primary functions of the drilling mud are to lubricate the drill bit, to transport rock cuttings to the surface, and to maintain a hydrostatic pressure in the wellbore sufficient to prevent the intrusion of formation fluids and thereby prevent blowouts.

Mud pulse telemetry utilizes the column of drilling mud which extends through the interior of the drill string or annulus as a telemetry link between downhole instruments and surface receiving equipment. The downhole insruments are generally contained in a drill string instrument sub located near the bottom of the drill string. These instruments are usually linked to a mud pulser contained in another drill string sub positioned adjacent to the instrument sub. The mud pulser generates pressure pulses in the drilling mud in response to signals received from the instruments. These pressure pulses are typically generated in the mud pulser by alternately opening and closing valves or vents through which the drilling mud flows. Closing and opening the valves respectively increases and decreases backpressure on the drilling mud. Each change in pressure constitutes a mud pulse signal, and the mud pulse signals typically form a binary code which carries the sought after information. These mud pulse signals are detected by a pressure transducer located at the surface. The pressure readings from the pressure transducer are processed and interpreted to decode the mud pulse signals and thereby yield information concerning downhole conditions.

At least two major technical problems have confronted mud pulse telemetry. The first problem concerns data transmission rates. Mud pulsers can be designed to generate mud pulse signals at frequencies exceeding one pulse per second. However, resolving such rapid mud pulse signals from one another at the surface has to date proved impractical. Hence, mud pulse signal frequencies of less than about one pulse every five seconds have generally been employed. If possible, it would be highly advantageous to increase mud pulse signal frequency, thereby increasing data transmission rates. Much effort has gone into the development of electronic data processing systems to improve mud pulse signal detection and decoding, but few have succeeded in increasing data transmission rates much beyond one mud pulse signal every five seconds or so.

The second major technical problem confronting mud pulse telemetry is that the pressure pulses generated by the mud pulser can be difficult to extract from pressure variations caused by other sources. Pressure variations caused by other sources constitute noise which tends to obscure the mud pulse signals. This noise is primarily a consequence of the moving pistons, valves and other mechanical components that make up the mud pump. Overcoming this noise problem has required the development of mud pulsers which generate powerful pressure pulses, and also the development of sophisticated electronic data processing systems.

There still exists a great need for a mud pulse telemetry method which overcomes the above-mentioned problems. The present invention is aimed at providing such a method.

SUMMARY OF THE INVENTION

The present invention overcomes the above-mentioned problems by monitoring changes in mud flow rate caused by a mud pulser. We have discovered that monitoring mud flow rate rather than mud pressure can result in faster data transmission rates due to improved resolution of mud pulse signals from one another. At the surface, mud flow rate responds more sharply to a downhole mud pulser than does mud pressure. In addition, signal to noise ratios for mud flow rate are much higher than for mud pressure. As a result, mud pulsers used in practicing the method of the present invention can be less powerful, more energy efficient and more reliable than those required for practicing prior art methods. Another benefit of the present invention is that the need for sophisticated data processing equipment to extract the mud pulse signals from background noise is reduced.

DESCRIPTION OF THE PREFERRED EMBODIMENT

Figure 1:
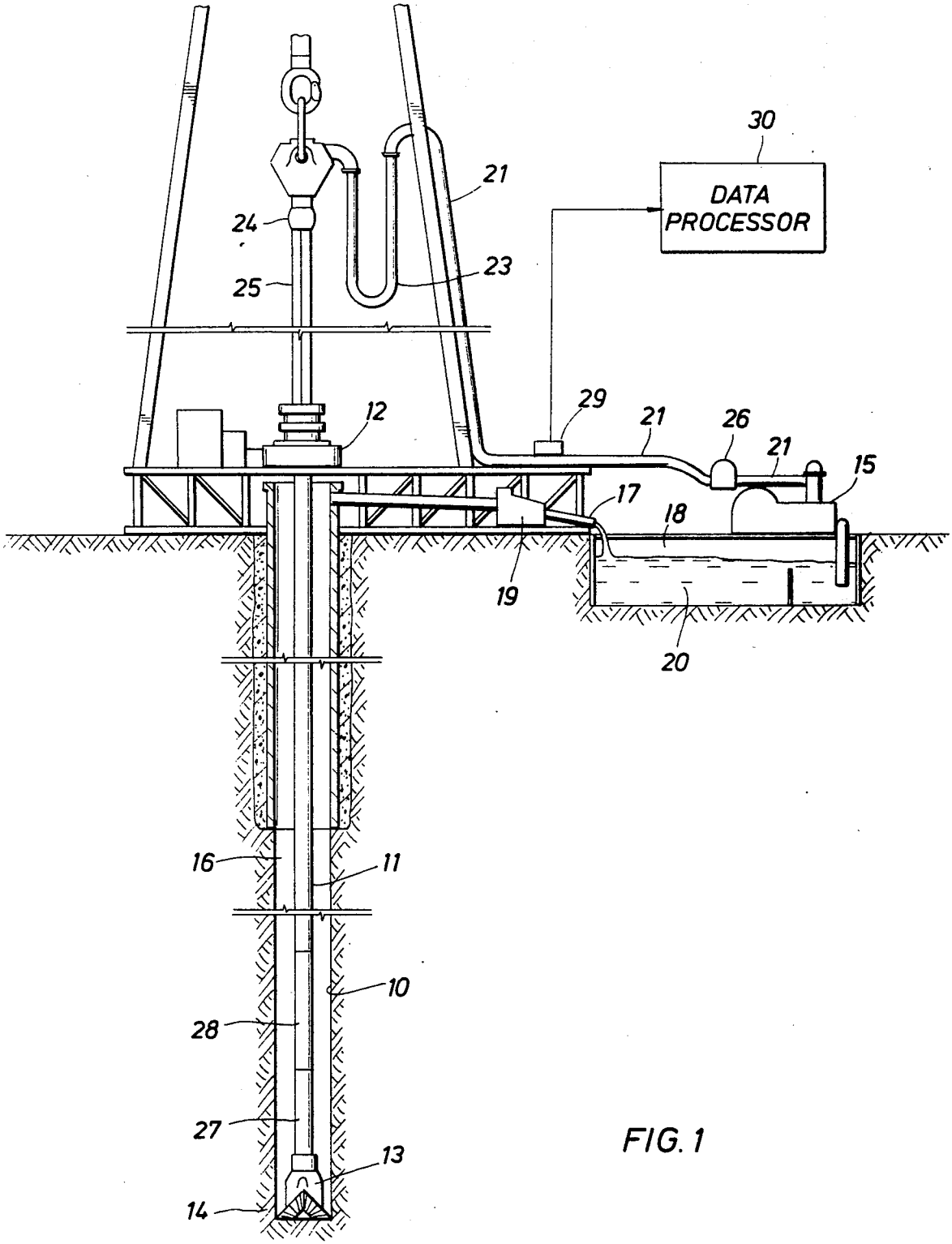
FIG. 1 is a side view, partly in section, of a drilling rig which employs the mud pulse telemetry method of the present invention.

Referring to FIG. 1, a side view, partly in section, of a drilling rig which employs the mud pulse telemetry method of the present invention can be seen. Wellbore 10 has been drilled into the earth to recover petroleum or other valuable resources. Drill string 11 is rotated by rotary table 12 which causes drill bit 13 to penetrate subsurface formation 14. Drilling mud is circulated by mud pump 15 downward through the hollow interior of drill string 11, through nozzles (not shown) in drill bit 13, and back up to the surface through annulus 16 between drill string 11 and the wall of wellbore 10. Drilling mud returning to the surface from annulus 16 flows through mud return line 17 into mud pit 18. Shale shaker 19 may be used to remove formation cuttings from the drilling mud as it returns to the surface.

Mud pump 15 draws drilling mud 20 from mud pit 18 and pumps the drilling mud through mud flow line 21, rotary hose 23, swivel connection 24, kelly 25 and drill string 11. Surge suppressor 26 is located on mud flow line 21 near the outlet of mud pump 15 to smooth out flow and pressure surges caused by the mud pump. Surge suppressers are well known to those skilled in the art.

Downhole instruments (not shown) are located inside instrument sub 27, which is made up on drill string 11 near drill bit 13. As is well known, various types of instruments can be contained in the instrument sub, including instruments for measuring formation pressure, temperature and conductivity and for measuring drill bit orientation and wear. These instruments generate signals, typically electrical, which are representative of the downhole information being collected. The signals are relayed to mud pulser sub 28 which is made up on drill string 11 adjacent to instrument sub 27. The mud pulser sub contains a mud pulser (not shown) which has valves, vents or other means for restricting the flow of drilling mud through the drill string in response to the signals from the instrument sub. For the sake of simplicity, the operation of mud pulsers which restrict flow by the opening and closing of one or more valves will be described. These and other types of mud pulsers are well known to those skilled in the art. Each time the mud pulser valves are opened or closed, a mud pulse signal is generated which propogates upward to the surface through the mud inside the drill string. The mud pulse signal comprises a change in the rate of mud flow, which is accompanied by a corresponding change in pressure.

Mud pulse signals are detected at the surface by flow meter 29, which is positioned on mud flow line 21 downstream from surge suppressor 26. Suitable flow meters for use in practicing the method of the present invention are magnetic flow meters such as the Foxboro Series 2800 magnetic flow meters manufactured by The Foxboro Company of Foxboro, Mass. Other types of commercially available flow meters, such as insertion type flow meters, can also be employed. Magnetic flow meters operate by establishing a magnetic field through which the slightly conductive drilling mud flows, thereby creating an electric potential. This potential, which is proportional to the rate of flow, is measured and amplified by electronics (not shown) associated with the magnetic flow meter. For a Foxboro Series 2800 magnetic flow meter, a Foxboro Series E96R transmitter can be used. These amplified measurements are sent by the transmitter to a strip chart recorder (not shown) and/or data processor 30, which processes and communicates the downhole information to drilling personnel. Suitable strip chart recorders and data processors are well known to those skilled in the art. By monitoring flow rate rather than pressure in accordance with the method of the present invention, mud pulse detection at the surface is greatly enhanced.

Figure 2:
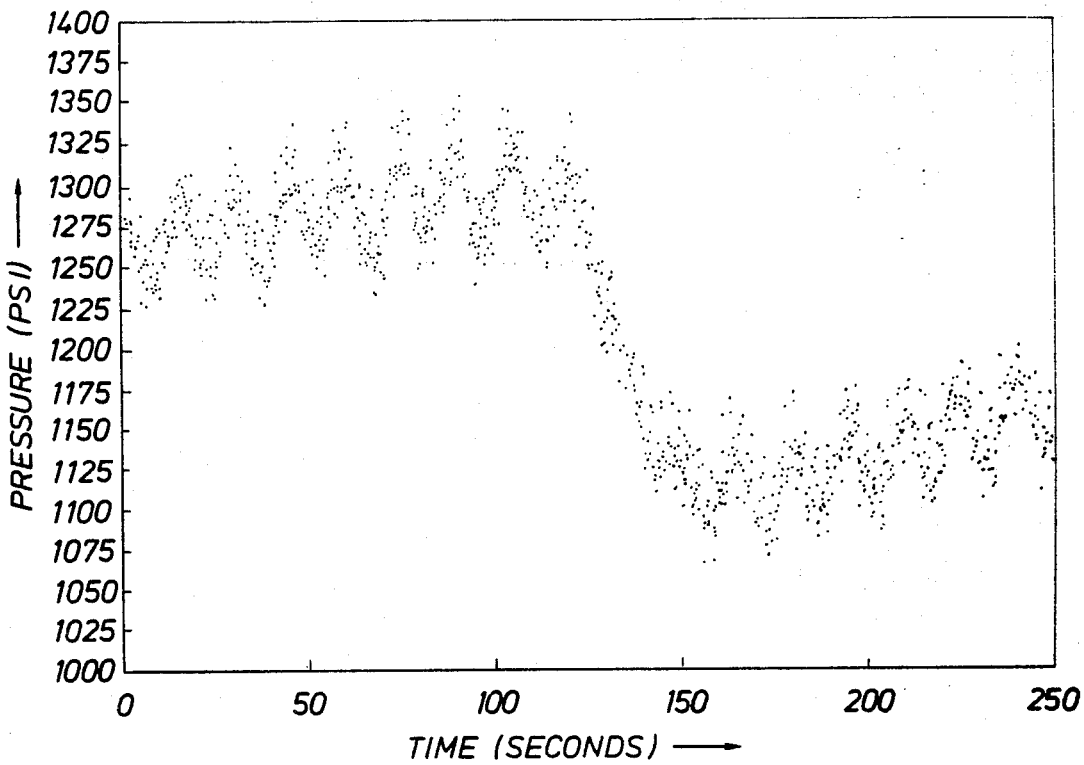
FIG. 2 is a graphical representation of mud pressure measurements made at the surface during operation of a downhole mud pulser.

Referring to FIG. 2, a graphical representation of mud pressure measurements made at the surface during operation of a downhole mud pulser can be seen. The graph is typical of prior art methods of detecting mud pulse signals and provides a comparison to the method of the present invention. In a test well approximately 1000 feet (305 meters) deep, a mud pulser contained in a mud pulser sub near the bottom of the drill string was driven by a clock circuit in order to transmit mud pulse signals in a square wave pattern with a ten second cycle. Thus, the mud pulser valves were alternately opening and closing once every five seconds. In essence, the clock circuit replaced the instrument sub which would be used in an actual MWD operation. The drill string was not rotated for the test. The test well setup was similar to that shown in FIG. 1, except that a strain gauge type pressure transducer was placed in the mud flow line near the flow meter to provide the desired comparison. Mud pressure was recorded every one-fourth of a second.

The plot of pressure versus time shown in FIG. 2 exhibits a sawtooth pattern rather than a square wave pattern. A square wave pattern would be expected if mud pulse resolution were precise. Thus, FIG. 2 shows the imprecise resolution typical of prior art methods which rely on pressure measurements at the surface. Although the individual pressure pulses can be discerned from the sawtooth pattern, a substantial increase in pulse frequency would result in signal loss due to insufficient resolution. The large change in pressure seen at about 125 seconds resulted from a decrease in mud pump speed, which caused a reduction in overall pressure.

Figure 3:
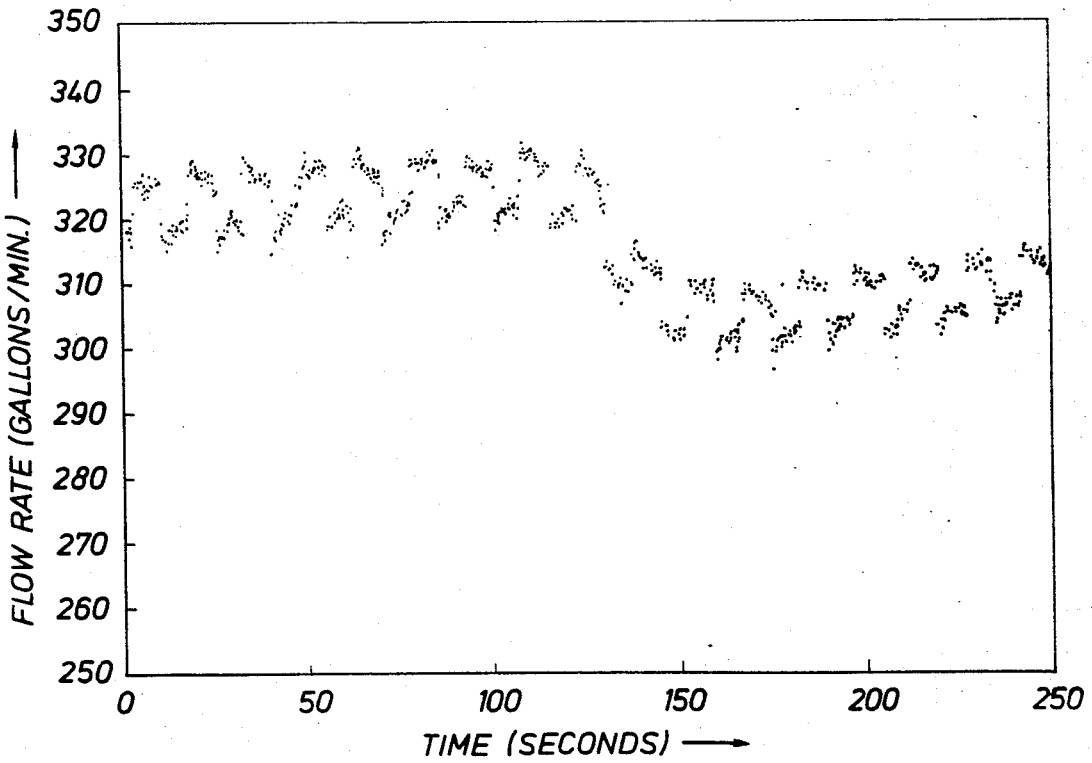
FIG. 3 is a graphical representation of mud flow rate measurements made at the surface during operation of a downhole mud pulser.

FIG. 3 shows the readout from a Foxboro 3-inch Series 2800 magnetic flow meter in accordance with the method of the present invention. The flow meter was positioned on the mud flow line downstream from the surge suppressor. Mud flow rate was recorded every one-fourth of a second. The flow meter recording was made at the same time as the pressure transducer recording shown in FIG. 2. Thus, the time scales on FIGS. 2 and 3 are contemporaneous. As can be clearly seen by referring to FIG. 3, the recording of flow rate approaches a square wave much more closely than the recording of pressure shown in FIG. 2. The difference can be attributed to improved resolution of the mud pulse signals using the method of the present invention. The improved resolution apparently results from faster response of flow rate than pressure to the mud pulse signals being generated by the downhole mud pulser. With the improved resolution achieved by the method of the present invention, the frequency of the mud pulser could be substantially increased to a level that is not practical for prior art methods. In this fashion, faster data transmission ratees can be achieved using the method of the present invention, with less need for sophisticated data processing equipment to detect and decode the signals being transmitted.

The discovery that flow rate responds more quickly than pressure to the signals being generated by the mud pulser at first seemed to present a paradox. As is well known, restricting a passageway through which a fluid is flowing decreases the rate of flow and at the same time increases backpressure on the fluid upstream from the restriction. Assuming constant power output from the mud pump, the relationship between pressure and flow will be an inverse linear one. This is evident from the following well known equation which gives the relationship of pump power to pressure and flow: Hydraulic Horsepower equals Pressure (psi) times Flow Rate (gallons per minute) divided by 1714. Thus, one would expect flow rate to respond to a restriction caused by a downhole mud pulser no more quickly and with no more relative amplitude than pressure. The pressure and flow rate changes associated with the mud pulse signal should propogate together to the surface. As a result, one would expect to gain no advantage by monitoring flow rate instead of pressure to detect mud pulse signals. Yet, as can be seen by comparing FIGS. 2 and 3, signal resolution is greatly enhanced when flow rate is monitored in accordance with the method of the present invention.

The key to explaining this apparent paradox seems to lie in the surge suppressor. As mentioned above, surge suppressors are typically installed on the mud flow line between the mud pump and the drill string to smooth out variations in flow caused by the pump. Surge suppressors are usually charged with a pressurized gas. This gas acts as a damper to smooth out fluctuations in flow and pressure. For example, if flow from the mud pump suddenly increases, the gas in the surge suppressor is compressed by the inflowing fluid, thus creating room for the excess fluid to be diverted into the surge suppressor and temporarily stored inside. As flow from the mud pump returns to normal, the gas in the surge suppressor expands to force the excess fluid out of surge suppressor and into the mud flow line. In this manner, the surge suppressor smooths out fluctuations in the mud flow and pressure caused by the mud pump. The action of the surge suppressor is desirable from the standpoint of maintaining a steady flow of drilling mud into the well at a constant pressure, but is undesirable from the standpoint of trying to measure mud pressure changes generated by a downhole mud pulser. The surge suppressor is designed to function as a pressure damping device and hence attempts to attentuate all transient pressure changes, including those generated by a mud pulser.

Consider the following. If a steady state flow of drilling mud is suddenly restricted by the action of a mud pulser, pressure in the mud flow line increases and thereby exceeds the pressure of the gas in the surge suppressor. As a result, mud is forced into the surge suppressor. As the surge suppressor begins to fill with drilling mud, the pressurized gas compresses and its pressure increases. When the gas has compressed a certain amount, the pressure in the surge suppressor and the pressure in the mud flow line will be balanced. When the balance is reached, flow to and from the surge suppressor is reduced to zero. If the restriction in the mud pulser is then opened to generate another mud pulse signal, the pressure in the mud flow line decreases. As a result, the pressure in the mud flow line becomes less than the pressure of the gas in the surge suppressor. Consequently, the gas in the surge suppressor expands and flushes out the excess drilling mud which filled the surge suppressor while the mud pulser was restricting flow. The flow of drilling mud from the surge suppressor continues until the pressures are balanced and flow to and from the surge suppressor is again zero.

The time it takes to go from one steady state to another is the time it takes to detect the full amplitude of the mud pulse signal generated by the mud pulser. If not for the surge suppressor, this time should be equal for flow rate measurements and pressure measurements. However, apparently due to the damping action of the surge suppressor, the time interval between steady states is much greater for pressure measurements than for flow rate measurements. Thus, the pressure measurements utilized by prior art MWD methods have a slower response time than the flow rate measurements utilized by the method of the present invention. The apparent reason for the difference in response times will now be explained in greater detail with reference to FIG. 4.

Figure 4:
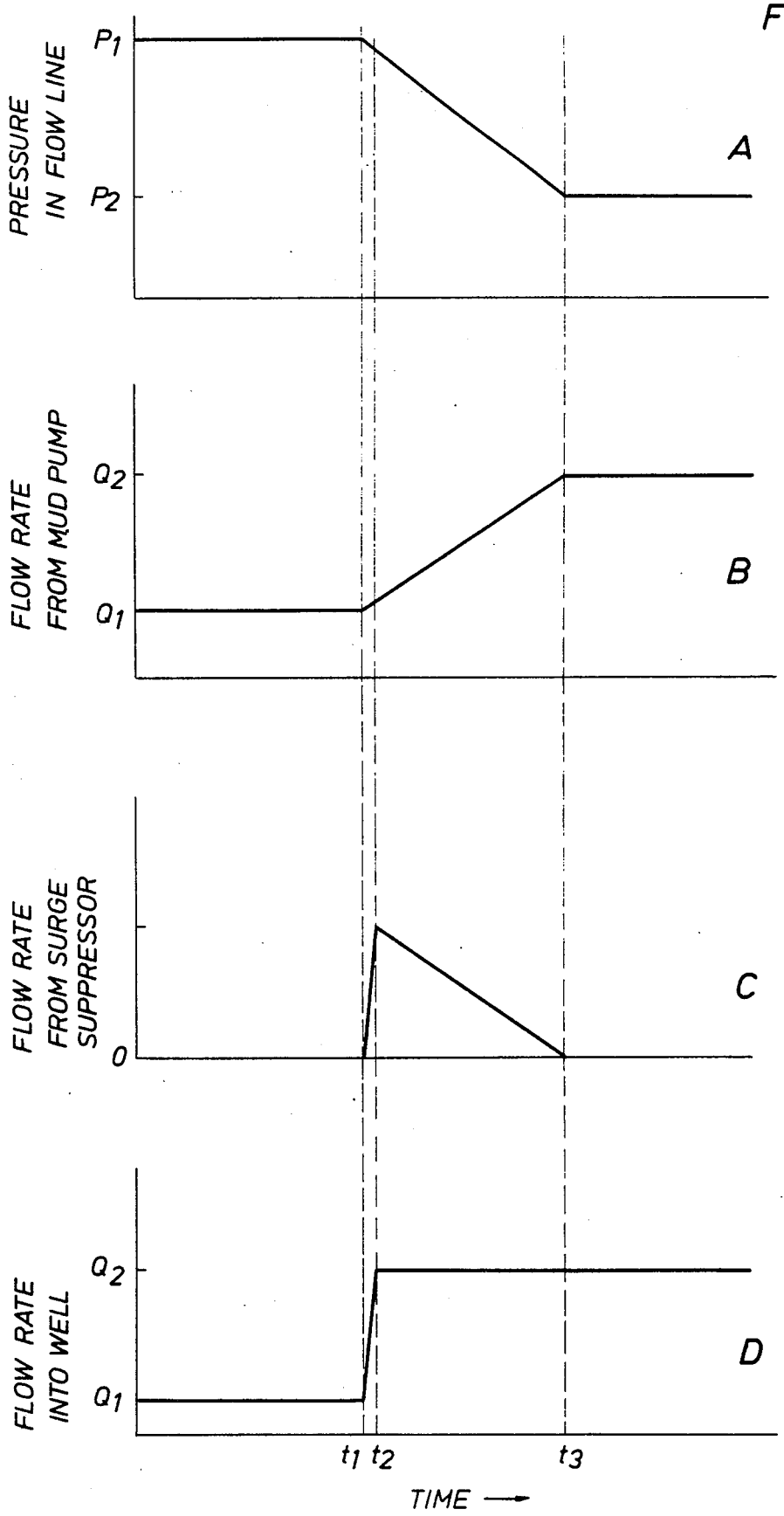
FIG. 4 shows four hypothetical graphs which serve to compare the time it takes for surface pressure measurements and surface flow rate measurements to respond to mud pulse signals generated by a downhole mud pulser.

FIG. 4 consists of four hypothetical graphs showing mud pressure and mud flow rate changes caused by a mud pulser. All four graphs are contemporaneous, as indicated by the common time scale. Graph 4A shows a plot of pressure in the mud flow line downstream from the surge suppressor versus time. Graph 4B shows a plot of the rate of mud flow from the mud pump versus time. Graph 4C displays the rate of mud flow from the surge suppressor versus time. Graph 4D shows the rate of mud flow into the well versus time, as measured in the mud flow line downstream from the surge suppressor. The rate of mud flow into the well shown in Graph 4D is the rate of mud flow from the surge suppressor shown in Graph 4C plus the rate of mud flow from the mud pump shown in Graph 4B.

Prior to time $t_1$, a steady state condition exists with the valves in the mud pulser being in a closed position. Mud flow line pressure is at $P_1$ (Graph 4A) and the rate of mud flow from the mud pump is at $Q_1$ (Graph 4B). The rate of mud flow into the well is also at $Q_1$ (Graph 4D) because there is no additional flow from the surge suppressor (Graph 4C), as expected during steady state conditions.

At time $t_1$, the mud pulser valves are opened to transmit a signal to the surface. Mud flow line pressure (Graph 4A) steadily drops in response to the decrease in backpressure caused by the opening of the valves. At the same time, the rate of mud flow from the mud pump (Graph 4B) steadily increases as a result of the drop in backpressure. The inverse linear relationship of Graphs 4A and 4B indicates that the mud pump is working at a constant power output. At time $t_3$, a new steady state is reached with mud flow line pressure at $P_2$ (Graph 4A). The interval between $t_1$ and $t_3$ on Graph 4A is the response time for detection of the full amplitude of the mud pulse signal generated by the mud pulsar using prior art methods.

Graph 4D shows the greatly reduced response time which results from use of the method of the present invention. Measurement of the rate of mud flow into the well shows that new steady state rate of flow $Q_2$ is reached at time $t_2$. The response time is the time interval between $t_1$ and $t_2$, which is much shorter than the interval between $t_1$ and $t_3$. The greatly reduced response time of mud flow rate compared to mud pressure as measured at the surface is apparently attributable to the flow from the surge suppressor (Graph 4C).

When the mud pulser valves are opened at time $t_1$ to transmit a mud pulse signal, the resulting decrease in backpressure causes the surge suppressor to expel the excess drilling mud which collected in it while the valves were closed, as explained above. This flow rate from the surge suppressor (Graph 4C) combines with the flow rate from the mud pump (Graph 4B) to yield the flow rate into the well (Graph 4D). The flow rate from the surge suppressor reaches a maximum at about $t_2$ and then gradually decreases to zero as the flow rate from the mud pump gradually increases to new steady state $Q_2$ at time $t_3$. The result is that the new steady state flow rate $Q_2$ into the well (Graph 4D) is reached at time $t_2$ long before it is reached in the mud pump at time $t_3$.

With the reduced response time achieved by monitoring the rate of mud flow in accordance with the method of the present invention, it is expected that data transmission rates can be greatly increased over those which are practical using pressure measurements as taught by the prior art. However, as mentioned above, this is not the only advantage that the method of the present invention has over prior art methods. In addition, signal to noise ratios are improved. As a result, the mud pulse signals can be extracted much more readily from background noise, which is caused primarily by the mud pump. Consequently, the need for sophisticated data processing equipment and powerful mud pulsers is reduced, thereby yielding cost savings. A further advantage is that the improved signal to noise ratio may make it practical to receive mud pulse signals from a mud pulser during periods of low mud flow rates often associated with well control problems. Real time downhole information is especially valuable during such periods and can potentially aid in the prevention of blowouts. Signal to noise ratios for prior art methods which monitor pressure changes are generally too low during periods of low mud flow rates to permit adequate detection of the signals. Thus, with prior art methods, the mud pulse signals can be unavailable when they are most needed.

Figure 5:
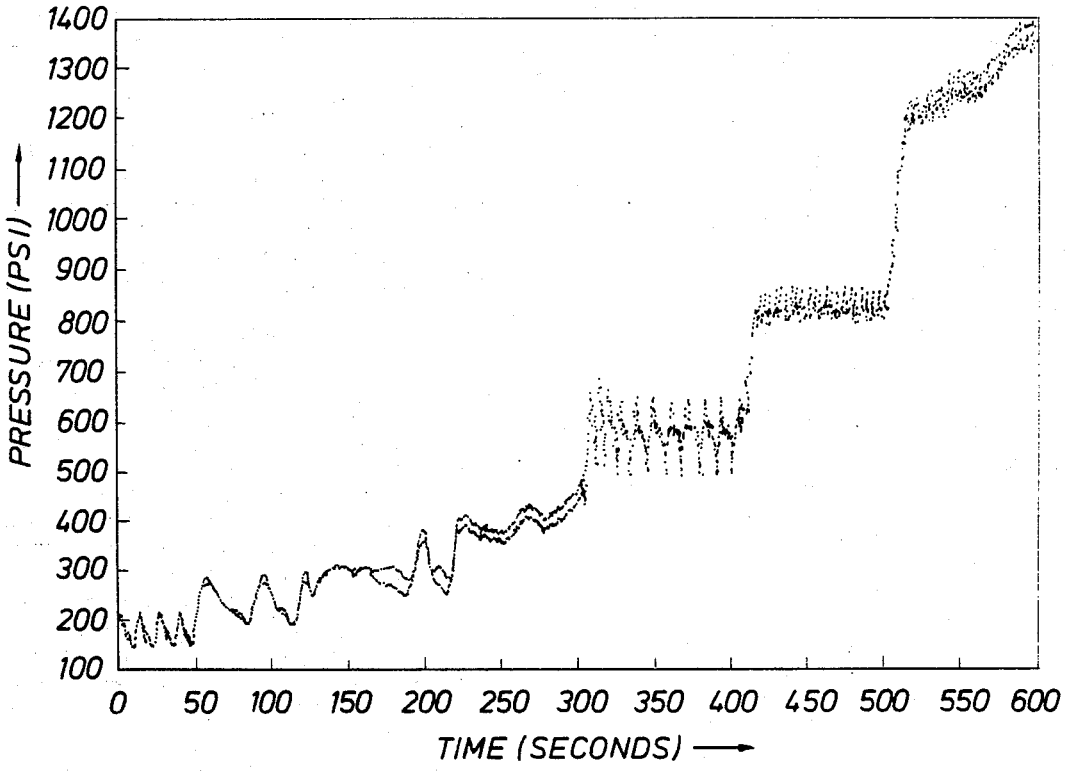
FIG. 5 is a graphical representation indicating the signal to noise ratio for mud pressure measurements made at the surface.
Figure 6:
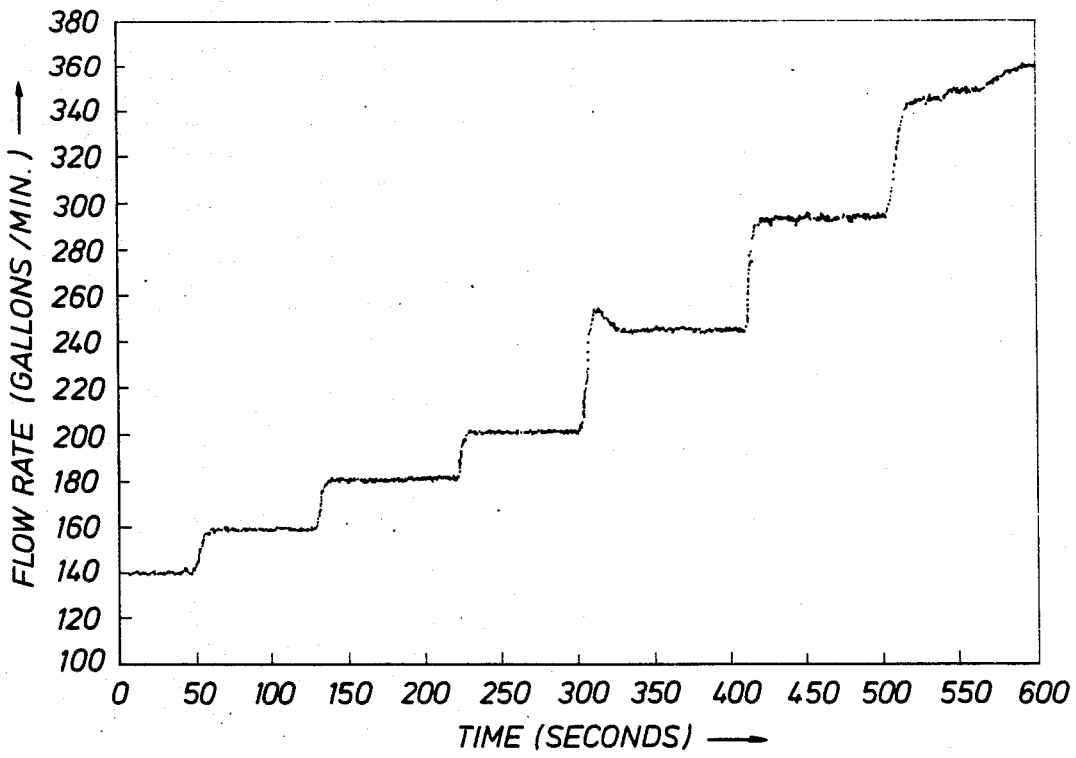
FIG. 6 is a graphical representation indicating the signal to noise ratio for mud flow rate measurements made at the surface.

FIGS. 5 and 6 permit a signal to noise ratio comparison between the method of the present invention and the prior art methods which rely solely on pressure measurements. The mud pressure and flow rate recordings respectively shown in FIGS. 5 and 6 were generated with the same test well setup described above with reference to FIGS. 2 and 3. FIG. 5 shows a recording from a strain gauge type pressure transducer located in the mud flow line downstream from the surge suppressor. Mud pressure was recorded every one-fourth of a second. The recording was made with the valves of the mud pulser open at all times. Thus, no mud pulse signals were being generated. The relatively large pressure increases seen at about 50, 125, 225, 300, 400 and 500 seconds were caused by increases in mud pump speed.

In the absence of noise, one would expect to see a smooth horizontal line corresponding to each of the different mud pump speeds since no mud pulse signals were generated. However, due to pressure variations caused primarily by the mud pump, the lines are not smooth but instead show substantial fluctuations in pressure. These fluctuations constitute noise which tends to obscure mud pulse signals in the prior art methods. The erratic and largely nonperiodic trace seen in FIG. 5 between 0 and about 300 seconds resulted because the pressure of the gas inthe surge suppressor (about 900 psi) greatly exceeded the mud pressure at the lowest mud pump speeds. Hence, the surge suppressor was unable to effectively dampen pressure surges from the mud pump. Thus, it can be seen that it would be especially difficult to detect mud pulse signals using pressure measurements at low mud pump speeds. In general, the lower the mud pump speed, the lower the signal to noise ratio and the poorer the signal detection.

FIG. 6 shows a recording of flow rates taken from a Foxboro 3-inch Series 2800 magnetic flow meter positioned on the mud flow line downstream from the surge suppressor and near the pressure transducer which was used to generate FIG. 5. Mud flow rate was recorded every one-fourth of a second. The time scale in FIG. 6 is contemporaneous with that in FIG. 5. Thus, the recordings shown in FIGS. 5 and 6 were made simultaneously. As can be readily seen in FIG. 6, the horizontal flow rate lines corresponding to the different mud pump speeds are much smoother than the pressure measurements shown in FIG. 5. This indicates that much less noise is being measured by the flow meter. The decreased noise makes it much easier to see the changes in mud pump speed at about 50, 125 and 225 seconds in FIG. 6 than in FIG. 5. Likewise, the decreased noise would make it much easier to detect mud pulse signals, which generally create flow rate and pressure changes of far less magnitude than those accompanying increases and decreases in mud pump speed.

The low noise associated with the method of the present invention for the most part can be attributed to the action of the surge suppressor, which functions to smooth out variations in mud pump flow rate, as explained above. Perhaps just as significant as the low overall noise level is the observation from FIG. 6 that the level of noise is relatively independent of pump speed when compared to prior art methods. This phenomenon may permit the method of the present invention to resolve mud pulse signals at the low mud flow rates often associated with well control problems.

The reduced noise which is characteristic of the method of the present invention creates other benefits as well. Due to improved signal to noise ratios, less powerful mud pulsers can be used. Such mud pulsers have lower energy requirements, are less expensive to build, and are more durable. In addition, the need for sophisticated data processing equipment to extract the desired mud pulse signals from the background noise is greatly reduced. Therefore, the method of the present invention should enhance the performance of measurement while drilling operations which utilize mud pulse telemetry.

In addition to decreased background noise, there is another reason why the method of the present invention enhances mud pulse signal detection at low mud flow rates. As mud pump speed decreases, flow rate and pressure drop. As a result, the absolute magnitude of the changes in pressure and flow rate generated by a mud pulser also drop. However, they do not drop by the same factor. The magnitude of the pressure changes generated by the mud pulser will drop to a greater extent than the magnitude of the flow rate changes. This difference is a consequence of the well known laws of fluid dynamics.

Inasmuch as the present invention is subject to many variations, modifications and changes in detail, it is intended that all subject matter discussed above and shown in the accompanying drawings be interpreted as illustrative and not in a limiting sense. For example, different flow meter placements can be used. Other variations, modifications and changes in detail will be obvious to those skilled in the art. Such variations, modifications and changes in detail are included within the scope of this invention as defined by the following claims.

We claim:

1. A method of obtaining information from a wellbore which is being drilled, said wellbore containing a drill string through which drilling mud is flowing, said method comprising the steps of:

(a) making measurements of one or more downhole parameters with one or more instruments positioned proximate to the lower portions of said drill string;

(b) generating changes in the flow rate of said drilling mud in response to and indicative of said measurements; and (c) monitoring the flow rate of said drilling mud proximate to the surface to detect said changes and thereby obtain said information.

2. The method of claim 1 wherein step (c) is the primary means for detecting said changes.

3. The method of claim 1 wherein step (c) is the sole means for detecting said changes.

4. The method of claim 1 wherein drilling mud pressure is not monitored to obtain said information.

5. The method of claim 1 wherein said changes in the flow rate of said drilling mud are generated by a mud pulser positioned in said drill string, said changes in flow rate constituting mud pulse signals.

6. The method of claim 5 wherein a flow meter is used to monitor said flow rate and thereby detect said mud pulse signals.

7. The method of claim 6 wherein said flow meter is a magnetic flow meter.

8. The method of claim 6 wherein a mud pump is used to flow said drilling mud through a mud flow line and into said drill string, said mud flow line being in fluid communication with said mud pump and said drill string, wherein a surge suppressor is positioned on said mud flow line between said mud pump and said drill string, and wherein said flow meter is positioned to monitor said flow rate in said mud flow line between said surge suppressor and said drilling string.

9. The method of claim 8 wherein the mud pulse signals detected by said flow meter are processed to obtain said information.

10. An improved method for obtaining information from a wellbore as it is being drilled, said wellbore containing a drill string through which drilling mud is flowing, said drilling mud being pumped into said drilling through a mud flow line, said drill string having a plurality of instruments positioned proximate to the lower portions thereof, said instruments being capable of making measurements of downhole conditions and of creating signals indicative of said measurements, said drill string further having a mud pulser which is adapted to receive said signals from said instruments and to generate mud pulse signals indicative of said measurements, wherein the improvement comprises measuring the flow rate of said drilling mud proximate to the surface to receive said mud pulse signals.

11. The method of claim 10 wherein the pressure of said drilling mud is not measured to receive said mud pulse signals.

12. The method of claim 11 wherein a surge suppressor is deployed on said mud flow line and wherein the flow rate through said mud flow line is measured between said surge suppressor and said drill string.

13. The method of claim 12 wherein a flow meter is used to measure said flow rate.

14. The method of claim 13 wherein said flow meter is adapted to provide an output representative of the measured flow rate and wherein said output is processed to detect and decode said mud pulse signals and thereby obtain said information.

* * * * *